United States Patent
Shoemaker

[11] 3,788,732
[45] Jan. 29, 1974

[54] FOUR COMPONENT MICROSCOPE EYEPIECE

[75] Inventor: Arthur H. Shoemaker, Aurora, N.Y.

[73] Assignee: American Optical Corporation, Southbridge, Mass.

[22] Filed: Sept. 11, 1972

[21] Appl. No.: 288,208

[52] U.S. Cl. .............................. 350/220, 350/175 E
[51] Int. Cl. .......................................... G02b 25/00
[58] Field of Search ........................ 350/175 E, 220

[56] References Cited
UNITED STATES PATENTS
3,638,996  2/1972  Klein ............................ 350/175 E X
3,623,791  11/1971  Uetake ........................ 350/175 E X

*Primary Examiner*—John K. Corbin
*Attorney, Agent, or Firm*—Alan H. Spencer; William C. Nealon

[57] ABSTRACT

This invention relates to a microscope eyepiece having a magnification of substantially 6.3X, an apparent field of view of substantially 38.6°, and a maximum exit pupil diameter of substantially 2.56 millimeters.

3 Claims, 1 Drawing Figure

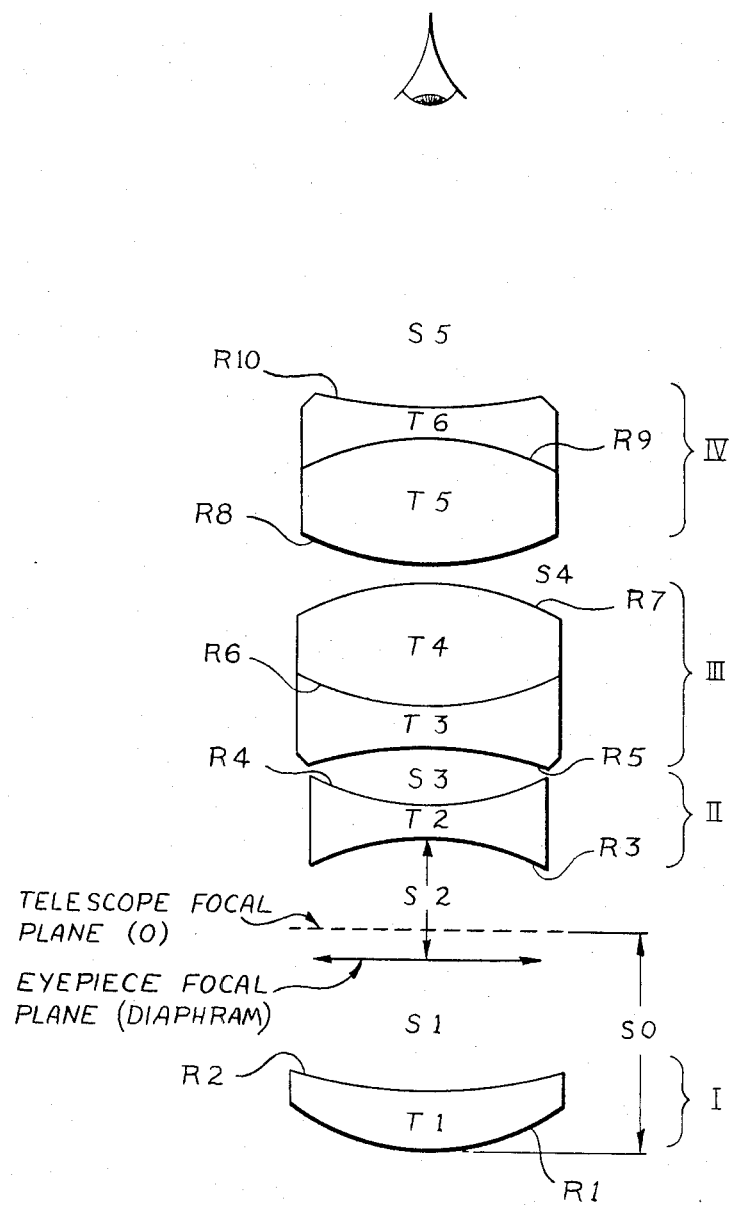

FOUR COMPONENT MICROSCOPE EYEPIECE

BACKGROUND OF THE INVENTION

This invention relates to improvements in an eyepiece for microscopes, and in particular to an eyepiece with a magnification of substantially 6.3X, an apparent field of view of substantially 38.6°, and a maximum exit pupil diameter of substantially 2.56 millimeters. The objects of this invention are to provide an eyepiece which is:

1. well corrected for the usual field aberrations, especially coma, astigmatism and distortion, while having a substantially flat field of view; and having a predetermined amount of lateral color to compensate residuals in the microscope objectives, while yet having a color free diaphragm;
2. well corrected for the pupil aberrations, especially pupil color and spherical aberration when used in conjunction with a telescope objective and associated prisms as part of an afocal viewing system in an infinity corrected microscope.

The Petzval radius is 7.5F for this eyepiece providing excellent image quality over the entire field of view. The eye-relief provided is 0.47F; which is adequate for comfortable viewing with or without eyeglasses.

DRAWING

The drawing is an optical diagram of a microscope eyepiece according to the present invention.

DESCRIPTION

The parameters of the lens elements which make up the objective are listed in the following table in which ND is the refractive index for the D line of sodium and $\nu$ is the Abbe number. Radii (R), thicknesses (T), and spacings (S) are expresed in millimeters and a negative sign indicates lens radii on centers of curvature on the object side of the lens.

| Radius R | Thickness T | Space S | Refractive index ND | Abbe number $\nu$ |
|---|---|---|---|---|
| R1 = 0.6676F | | S0 = −0.4015F | | |
| | T1 = 0.2018F | | ND1 = 1.69680 | $\nu$1 = 56.15 |
| R2 = 8.3236F | | | | |
| | | S1 = 0.1663F | | |
| R3 = −0.7242F | | S2 = 0.2207F | | |
| | T2 = 0.0379F | | ND2 = 1.74077 | $\nu$2 = 27.60 |
| R4 = 0.4288F | | | | |
| | | S3 = 0.0775F | | |
| R5 = −2.1791F | | | | |
| | T3 = 0.1009F | | ND3 = 1.60140 | $\nu$3 = 38.23 |
| R6 = 0.6313F | | | | |
| | T4 = 0.2549F | | ND4 = 1.73350 | $\nu$4 = 51.65 |
| R7 = −0.6313F | | | | |
| | | S4 = 0.0051F | | |
| R8 = 0.6313F | | | | |
| | T5 = 0.2549F | | ND5 = 1.73350 | $\nu$5 = 51.65 |
| R9 = −0.6313F | | | | |
| | T6 = 0.1009F | | ND6 = 1.60140 | $\nu$6 = 38.23 |
| R10 = 2.1791F | | | | |
| | | S5 = 0.4701F | | |

The foregoing parameters of radius, thickness, and spacings are functions of the equivalent focal length F of the objective. The value of F as an example is 39.65 millimeters. In this focal length, the absolute values of the foregoing data is as follows:

F = 39.65   MAGNIFICATION = 6.3X

| Radius R | Thickness T | Space S | Refractive index ND | Abbe number $\nu$ |
|---|---|---|---|---|
| | | S0 = −15.918 | | |
| R1 = 26.47 | | | | |
| | T1 = 8.00 | | ND1 = 1.6968 | $\nu$1 = 56.15 |
| R2 = 330.03 | | | | |
| | | S1 = 6.592 | | |
| | | S2 = 8.750 | | |
| R3 = −28.715 | | | | |
| | T2 = 1.50 | | ND2 = 1.74077 | $\nu$2 = 27.60 |
| R4 = 17.00 | | | | |
| | | S3 = 3.074 | | |
| R5 = −86.40 | | | | |
| | T3 = 4.000 | | ND3 = 1.60140 | $\nu$3 = 38.23 |
| R6 = 25.03 | | | | |
| | T4 = 10.107 | | ND4 = 1.73350 | $\nu$4 = 51.65 |
| R7 = −25.03 | | | | |
| | | S4 = 0.20 | | |
| R8 = 25.03 | | | | |
| | T5 = 10.107 | | ND5 = 1.73350 | $\nu$5 = 51.65 |
| R9 = −25.03 | | | | |
| | T6 = 4.00 | | ND6 = 1.60140 | $\nu$6 = 38.23 |
| R10 = 86.40 | | | | |
| | | S5 = 18.64 | | |

In the foregoing tables, negative signs represent concave radii going from left to right.

Having thus described the invention in detail and with sufficient particularity to enable those skilled in the art to practice it, what is desired to have protected by Letters Patent is set forth in the following claims.

What is claimed is:

1. A four component microscope eyepiece having a magnification of substantially 6.3X, an apparent field of view of substantially 38.6°, a maximum exit pupil diameter of substantially 2.56 millimeters, a Petzval radius of 7.5F, and having an eye relief of 0.47F wherein F is the focal length, and characterized by good correction for pupil aberrations, pupil color and spherical aberration when used in conjunction with a telescope objective and associated prisms as part of an afocal viewing system in an infinity correcting system and comprising the following components in optical alignment: a convex-concave lens I; a double concave negative lens II; a double III consisting of a double concave negative lens cemented to a double convex lens, and a doublet IV, consisting of a double convex lens cemented to a double concave negative lens.

2. The microscope eyepiece of claim 1 in which the parameters of lens radii (R), thicknesses (T), and spacings (S) are expressed in millimeters and a negative sign indicates lens radii on centers of curvature on the object side of the lens

MAGNIFICATION=6.3×

| Radius R | Thickness T | Space S | Refractive index ND | Abbe number ν |
|---|---|---|---|---|
| R1 = 0.6676F | T1=0.2018F | S0 = −0.4015F | ND1 = 1.69680 | ν1 = 56.5 |
| R2 = 8.3236F | | | | |
| | | S1 = 0.1663F | | |
| R3 = −0.7242F | T2 = 0.0379F | S2 = 0.2207F | ND2 = 1.74077 | ν2 = 27.60 |
| R4 = 0.4288F | | | | |
| | | S3 = 0.0775F | | |
| R5 = −2.1791F | T3 = 0.1009F | | ND3 = 1.60140 | ν3 = 38.23 |
| R6 = 0.6313F | T4 = 0.2549F | | ND4 = 1.73350 | ν4 = 51.65 |
| R7 = −0.6313F | | S4 = 0.0051F | | |
| R8 = 0.6313F | T5 = 0.2549F | | ND5 = 1.73350 | ν5 = 51.65 |
| R9 = −0.6313F | T6 = 0.1009F | | ND6 = 1.60140 | ν6 = 38.23 |
| R10 = 2.1791F | | S5 = 0.4701F | | |

3. The microscope eyepiece of claim 2 in which $F = 39.65$.

* * * * *